(12) United States Patent
Junge et al.

(10) Patent No.: US 11,306,623 B2
(45) Date of Patent: Apr. 19, 2022

(54) SYSTEM CONSISTING OF A CAMSHAFT AND A CAMSHAFT SLEEVE

(71) Applicants: THYSSENKRUPP PRESTA TECCENTER AG, Eschen (LI); thyssenkrupp AG, Essen (DE)

(72) Inventors: Volker Junge, Wernigerode (DE); Falk Heitling, Essen (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 527 days.

(21) Appl. No.: 16/301,507

(22) PCT Filed: May 19, 2017

(86) PCT No.: PCT/EP2017/062071
§ 371 (c)(1),
(2) Date: Nov. 14, 2018

(87) PCT Pub. No.: WO2017/202711
PCT Pub. Date: Nov. 30, 2017

(65) Prior Publication Data
US 2019/0293124 A1    Sep. 26, 2019

(30) Foreign Application Priority Data
May 23, 2016 (DE) .................... 10 2016 109 444.7

(51) Int. Cl.
*F01L 1/04* (2006.01)
*F16D 1/10* (2006.01)
(Continued)

(52) U.S. Cl.
CPC ............... *F01L 1/047* (2013.01); *F16D 1/10* (2013.01); *F16D 1/104* (2013.01); *F16D 1/108* (2013.01);
(Continued)

(58) Field of Classification Search
CPC ..... F01L 1/047; F01L 2001/0473; F16D 1/10; F16D 1/104; F16D 1/108; F16D 2001/103; F16H 53/025
See application file for complete search history.

(56) References Cited

U.S. PATENT DOCUMENTS 5,299,881 A * 4/1994 Mettler-Friedli ....... F01L 1/047
403/274
5,392,566 A * 2/1995 Wedeniwski ........... B24B 19/12
451/11
(Continued)

FOREIGN PATENT DOCUMENTS

CN    1789674 A    6/2006
CN    104428497 A    3/2015
(Continued)

OTHER PUBLICATIONS

Machine translation of JP H0932519 A obtained on Apr. 5, 2021.*
English Translation of International Search Report issued in PCT/EP2017/062071, dated Aug. 24, 2017.

*Primary Examiner* — Adam D Rogers
(74) *Attorney, Agent, or Firm* — thyssenkrupp North America, LLC

(57) ABSTRACT

A system including a camshaft and a camshaft sleeve. The camshaft sleeve has a sleeve-shaped main body for receiving an end region of the cam-shaft. The main body includes a joining region, a bearing region and a seat region. The main body and the camshaft are configured in such a way that, in the mounted state, the cam-shaft is joined in the joining region to the camshaft sleeve, the system having, in the bearing region, a clearance between the camshaft and the camshaft sleeve, and the camshaft and the camshaft sleeve are connected to one another in the seat region via a positively locking means and/or a frictionally lock, in particular a toothing system.

16 Claims, 1 Drawing Sheet

(51) Int. Cl.
*F16H 53/02* (2006.01)
*F01L 1/047* (2006.01)
*F16D 1/104* (2006.01)
*F16D 1/108* (2006.01)

(52) U.S. Cl.
CPC .... *F16H 53/025* (2013.01); *F01L 2001/0473* (2013.01); *F16D 2001/103* (2013.01)

(56) References Cited

U.S. PATENT DOCUMENTS

| | | | |
|---|---|---|---|
| 10,626,759 B2* | 4/2020 | Smerczak | F01L 1/24 |
| 2007/0181086 A1* | 8/2007 | Asbeck | F01L 1/047 |
| | | | 123/90.6 |
| 2015/0192043 A1* | 7/2015 | Methley | F01M 9/102 |
| | | | 74/567 |

FOREIGN PATENT DOCUMENTS

| | | |
|---|---|---|
| DE | 10 2009 024 455 A | 1/2011 |
| DE | 10 2011 101 400 A | 11/2012 |
| DE | 10 2012 109 689 A | 4/2014 |
| EP | 0 745 757 A | 12/1996 |
| JP | H0932519 A | 2/1997 |
| WO | 2010/021225 A | 2/2010 |
| WO | 2013/171321 A | 11/2013 |
| WO | 2015/180896 A | 12/2015 |

\* cited by examiner

SYSTEM CONSISTING OF A CAMSHAFT AND A CAMSHAFT SLEEVE

CROSS REFERENCE TO RELATED APPLICATIONS

This application is a U.S. National Stage Entry of International Patent Application Serial Number PCT/EP2017/062071, filed May 19, 2017, which claims priority to German Patent Application No. DE 10 2016 109 444.7, filed May 23, 2016, the entire contents of both of which are incorporated herein by reference.

FIELD

The present disclosure generally relates to a system comprising a camshaft and a camshaft sleeve.

BACKGROUND

Camshafts are well known from the prior art and can be used, for example, in vacuum pumps, fuel pumps or internal combustion engines. Here, elevations are provided in the radial direction for the camshafts, in particular on the end sides, which elevations are realized by way of a camshaft sleeves. The camshaft can be mounted rotatably in the apparatus, in which it is installed, via said circumferential elevation which is provided by way of the camshaft sleeves. In particular, the apparatus which is to be equipped with the camshaft comprises a seat which is configured in such a way that the camshaft can be mounted in the apparatus with as little friction as possible via the camshaft sleeve.

Here, the mounting of the camshaft sleeve on the camshaft as a rule takes place by means of a screw connection. Screw connections of this type can lead occasionally to deformations of functionally critical regions, for example in the bearing region.

Thus a need exists for a system comprising a camshaft sleeve and a camshaft, which system is improved in comparison with the systems which are known from the prior art with regard to the quality of the provided camshaft after the mounting of the camshaft sleeve.

DETAILED DESCRIPTION

Figure 1:
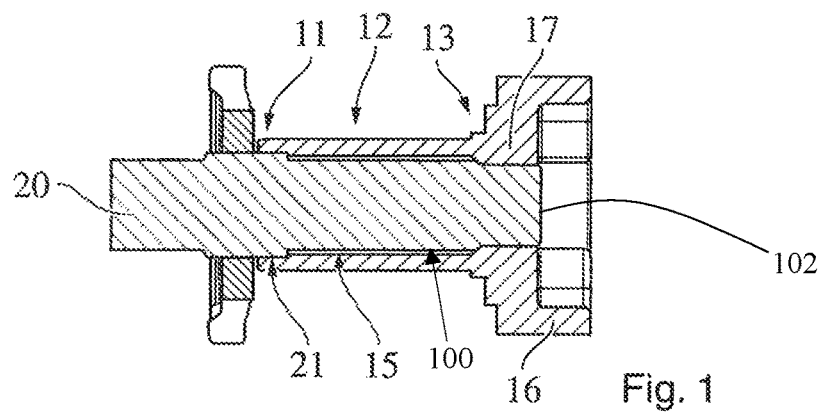
FIG. 1 is a sectional view of a system comprising a camshaft and a camshaft sleeve in accordance with an example.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a system comprising a camshaft and a camshaft sleeve.

In some examples, a system comprising a camshaft and a camshaft sleeve, the camshaft sleeve having a sleeve-shaped main body for receiving an end region of the camshaft, the main body comprising a joining region, a bearing region and a seat region, the main body and the camshaft being configured in such a way that, in the mounted state, the camshaft is joined to the camshaft sleeve in the joining region, the system having, in the bearing region, a clearance between the camshaft and the camshaft sleeve, and the camshaft and the camshaft sleeve being connected to one another in the seat region via at least one positively locking means or a frictionally locking means, in particular a toothing system.

In comparison with the methods which are known from the prior art, the system according to the invention allows a screw connection of the camshaft sleeve on the camshaft to be dispensed with. As a result, deformations which would otherwise be caused by way of the screw connection can be avoided, which has a positive effect on the quality of the manufactured camshaft with the camshaft sleeve. Moreover, the number of components and the machining complexity are reduced, without impairing a process reliability, strength and stability of the system in a disadvantageous way. Moreover, the system according to the invention allows mounting of a finally machined component. Furthermore, the clearance between the main body and the camshaft sleeve advantageously necessitates an open space, by way of which a diameter change of the finally machined bearing external diameter can be prevented.

In particular, in the mounted state, the camshaft sleeve is mounted at one end of the camshafts, that is to say at their end side, and forms, for example, their termination. Furthermore, it is conceivable that the camshaft sleeve has, on its outer side, a circumferential collar or projection which is directed outward in the radial direction. In particular, by way of the collar or projection, the camshaft sleeve terminates the assembled system in the axial direction. Furthermore, it is conceivable that the camshaft and the camshaft sleeve are configured in such a way that the camshaft can be inserted with an accurate fit into the joining region of the camshaft sleeve. To this end, an internal diameter of the camshaft sleeve in the joining region corresponds, for example, substantially to an external diameter of the camshaft, in particular on its end side. Furthermore, it is provided that the camshaft comes into contact with the camshaft sleeve in the joining region. To this end, at its one end, the camshaft sleeve comprises, for example, a radially inwardly directed collar or a flat termination which terminates the camshaft sleeve at one end in the axial direction. In the case of the use of an inwardly directed collar, material can be saved in an advantageous way. It is conceivable here that, in addition to the sleeve-shaped main body, the camshaft sleeve also comprises a closed part, a drive groove being milled into the closed part, for example.

Advantageous refinements and developments of the invention can be gathered from the subclaims and the description, with reference to the drawings.

It is provided in accordance with a further embodiment of the present invention that the bearing region is arranged in the axial direction between the joining region and the seat region. In particular, the joining region, the bearing region and the seat region are arranged next to one another in the axial direction. It is provided, furthermore, that the seat region is arranged at an open end of the camshaft sleeve, the open end being that end, through which the camshaft engages in the mounted state.

It is provided in accordance with a further embodiment of the present invention that the main body has, in the bearing region, a cylindrical cavity, the diameter of which is greater than the external diameter of that end region of the camshaft which is arranged within the bearing region in the mounted state. As a result, a clearance can be provided in an advantageous way which makes an open space possible, by way of which in turn a diameter change of the finally machined bearing external diameter can be prevented.

It is provided in accordance with a further embodiment of the present invention that the camshaft has a toothing system in a section which is provided for the seat region in the mounted state. It is possible in an advantageous way by means of the toothing system to perform an angular orientation of the camshaft sleeve with respect to the camshaft in a targeted manner. Moreover, it permits a torque which can be additionally transmitted and an additional axial firm seat. Furthermore, it is provided that, in the mounted state, the toothing system on the circumference of the camshaft extends further beyond the termination of the camshaft sleeve in the axial direction. That is to say, the camshaft which protrudes out of the camshaft sleeve in the mounted state continues the toothing system which is arranged within the main body. It is conceivable here that a toothing system which is arranged outside the main body in the mounted state extends at least precisely as long in the axial direction as a toothing system which is arranged within the main body in the mounted state.

It is provided in accordance with a further embodiment of the present invention that, in the mounted state, the toothing system of the camshaft engages into an internal toothing system in the seat region of the main body. Here, the toothing system of the camshaft and the internal toothing system of the main body are, in particular, of complementary configuration, in particular with regard to their shape, with the result that they can engage into one another without problems. It is conceivable, furthermore, that a number of teeth of the internal toothing system is reduced. For example, the internal toothing system and the toothing system are configured in such a way that a plurality of teeth of the toothing system on the camshaft are arranged between two teeth of the internal toothing system.

It is provided in accordance with a further embodiment of the present invention that the toothing system and the internal toothing system have an overlap in the seat region. In order to configure an overlap, in particular, two gearwheels are situated in engagement at the same time in an alternating manner with one or more tooth pairs which follow one another. Here, the overlap specifies how many tooth pairs are in engagement at the same time on average. The overlap is preferably greater than 1.5 and particularly preferably greater than 2; the overlap can be determined as a ratio of the engagement length to the pitch of the gearwheel. For example, the toothing system in the seat region is a helical toothing system, by way of which comparatively great overlaps can be achieved in an advantageous way.

It is provided in accordance with a further embodiment of the present invention that the camshaft sleeve comprises a sinter-hardened component or is joined at least partially onto a turned part which can be hardened.

A further subject matter of the present invention is a camshaft sleeve for a system according to the invention. It is conceivable here that the camshaft sleeve is compatible with a multiplicity of different camshafts.

A further subject matter of the present invention is a method for assembling a system according to the invention, the camshaft being introduced with an end region into a sleeve-shaped main body with a seat region, a bearing region and a joining region, the camshaft being oriented, in particular during the introduction, by way of at least one positively locking means or frictionally locking means in the seat region, and the camshaft being joined with a distal end of the end region in the joining region of the sleeve-shaped main body.

Further details, features and advantages of the invention result from the drawings and from the following description of embodiments using the drawings. Here, the drawings illustrate merely exemplary embodiments of the invention which do not restrict the concept of the invention.

FIG. 1 shows a system comprising a camshaft 20 and a camshaft sleeve 10 in accordance with one exemplary embodiment of the present invention. For example, this is a system which is used in a vacuum pump or fuel pump or in an internal combustion engine. It is provided here that the camshaft sleeve 10 terminates the camshaft 20 at one end and is provided for mounting in a camshaft holder. For the mounting in the camshaft holder, the camshaft sleeve 10 comprises, for example, a circumferential projection or collar 16, by way of which the system is connected to the camshaft holder in the installed state. Here, in particular, the camshaft sleeve 10 has a sleeve-shaped main body 17, through the one open end of which the camshaft 20 engages into the main body 17 in a mounted state. Here, the sleeve-shaped main body 17 encases an end region 100 of the camshaft 20 and therefore forms a termination of the camshaft 20, for example, in the mounted state. Within the end region 100, a distal end 102 of the camshaft 20 may be disposed at an axial end face of the camshaft 20. It is provided, furthermore, that the camshaft 20 and the camshaft sleeve 10 are configured in such a way that, in the mounted state, the system comprises a joining region 13, a bearing region 12 and a seat region 11. In order to configure a joining region 13, it is provided, in particular, that the camshaft 20 comes into contact by way of its end side with an at least partially closed end side of the sleeve-shaped main body 17 and is joined in said joining region. To this end, the internal diameter of the seat in the joining region 13, which seat is predefined by the sleeve-shaped main body 17, corresponds substantially to the external diameter of the camshaft 20, in particular on the end side of the camshaft 20. In order to configure a bearing region 12, it is conceivable that the internal diameter of the main body 17 in the bearing region 12 is greater than the external diameter of the camshaft 20, with the result that a clearance 15 is configured between the camshaft 20 and the camshaft sleeve 10. As viewed in the axial direction, the internal diameter increases here from the joining region 13 to the bearing region 12. Furthermore, it is conceivable here that a transition between the internal diameter of the joining region 13 and the internal diameter of the bearing region 12 takes place in a stepped or continuous manner. The clearance 15 which is necessitated as a result of the variation of the internal diameter between the camshaft 20 and the camshaft sleeve 10 advantageously prevents a diameter change of a finally machined bearing external diameter. In order to configure a seat region 11, it is provided that the sleeve-shaped main body 17 has, in particular at its open end, an internal toothing system 14, and the camshaft 20 has a toothing system 21 along its circumference, the toothing system 21 of the camshaft 20 and the internal toothing system 14 of the main body 17 engaging into one another in the seat region 11. Furthermore, it is conceivable that the toothing system 21 extends further or longer along an axial direction than the internal toothing system 14 of the main body 17. The use of toothed structures in the seat region proves advantageous, in so far as a targeted angular orientation, an additional transmission of a torque and an additional axial firm seat for the camshaft in the camshaft sleeve are possible in an advantageous way as a result. It is provided here, for example, that the toothing system in the seat region has an overlap which is greater than 1.5, in particular is greater than 2.5.

Figure 2:
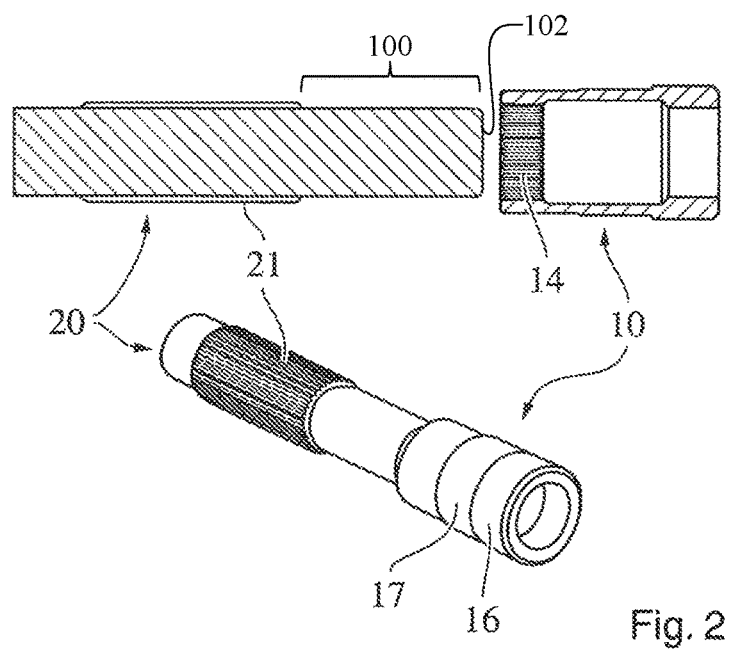
FIG. 2 is a sectional and perspective view of a system comprising a cam-shaft and a camshaft sleeve in accordance with an example in a non-mounted state.
Figure 3:
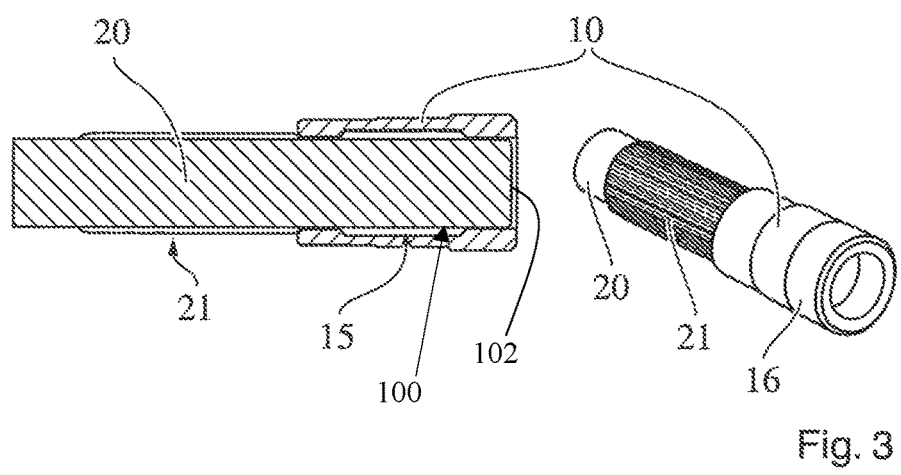
FIG. 3 is a sectional and perspective view of a system comprising a cam-shaft and a camshaft sleeve in accordance with the example in a mounted state.

FIG. 2 shows a sectional view (top) and a perspective view (bottom) of a system comprising a camshaft 20 and a camshaft sleeve 10 in accordance with a further exemplary embodiment of the present invention in a non-mounted state, whereas FIG. 3 illustrates a sectional view and a perspective view of a system comprising a camshaft 20 and a camshaft sleeve 10 in accordance with a second exemplary embodiment of the present invention in a mounted state. The system which is shown in FIGS. 2 and 3 differs from that from FIG. 1 substantially in that the toothing system on the camshaft protrudes further out of the sleeve-shaped main body 17, and the internal toothing system 14 on the sleeve-shaped main body 17 can be seen.

LIST OF DESIGNATIONS

10 Camshaft sleeve
11 Seat region
12 Bearing region
13 Joining region
14 Internal toothing system
15 Clearance
16 Collar
17 Main body
20 Camshaft
21 Toothing system
30 Cavity
100 End region
102 Distal end

What is claimed is:

1. A system, comprising:
a camshaft including an end region, and
a camshaft sleeve including a main body configured to receive the end region, the main body comprising a joining region, a bearing region, and a seat region, with the joining region being disposed axially closer to a distal end of the camshaft where the end region is located than the bearing region and the seat region,
wherein the main body and the camshaft are configured such that, in a mounted state, the camshaft is joined in the joining region to the camshaft sleeve,
wherein the system has, in the bearing region, a clearance between the camshaft and the camshaft sleeve, and the camshaft and the camshaft sleeve are connected to one another in the seat region via at least one positive lock or a frictional lock.

2. The system of claim 1, wherein the at least one positive lock or the frictional lock that connects the camshaft and the camshaft sleeve is a toothing system.

3. The system of claim 1, wherein the bearing region is arranged axially between the joining region and the seat region.

4. The system of claim 1, wherein the main body has, in the bearing region, a cylindrical cavity, a diameter of which is greater than an external diameter of the end region of the camshaft which is arranged within the bearing region in the mounted state.

5. The system of claim 1, wherein the camshaft has a toothing system in a section which is provided for the seat region in the mounted state, wherein the toothing system of the camshaft constitutes at least part of the at least one positive lock or the frictional lock that connects the camshaft and the camshaft sleeve.

6. The system of claim 5, the toothing system of the camshaft engaging, in the mounted state, into an internal toothing system of the camshaft sleeve in the seat region of the main body, wherein the internal toothing system of the camshaft sleeve constitutes at least part of the at least one positive lock or the frictional lock that connects the camshaft and the camshaft sleeve.

7. The system of claim 6, the toothing system and the internal toothing system in the seat region having an overlap.

8. The system of claim 1, wherein the camshaft sleeve comprises a sinter-hardened component.

9. A method for assembling the system of claim 1, comprising:
introducing the camshaft end region into the main body,
orienting the camshaft by way of the at least one positive lock or the frictional lock in the seat region, and
joining the distal end of the end region and the camshaft to the main body in the joining region.

10. The system of claim 1 wherein the joining region is disposed at the distal end of the end region of the camshaft.

11. The system of claim 1 wherein in the mounted state the camshaft is axially fixed in the joining region to the camshaft sleeve.

12. The system of claim 1 wherein the camshaft sleeve comprises a collar that projects radially outwards, wherein the distal end of the camshaft is disposed at an axial location that coincides with the collar.

13. The system of claim 1 wherein a radially most narrow portion of the camshaft sleeve is disposed at the joining region.

14. The system of claim 1 wherein the camshaft sleeve protrudes axially relative to the camshaft.

15. The system of claim 1 wherein an entirety of a transition between an inner diameter of the camshaft sleeve at the joining region and an inner diameter of the camshaft sleeve at the bearing region is oblique relative to a longitudinal axis of the camshaft.

16. The system of claim 1 wherein the end region of the camshaft is disposed in a blind hole of the camshaft sleeve.

* * * * *